United States Patent
Stephens

(10) Patent No.: US 7,634,868 B2
(45) Date of Patent: Dec. 22, 2009

(54) INGESTIBLE SUBSTANCE DISPENSER AND METHODS

(76) Inventor: Matthew Stephens, P.O. Box 8189, Cincinnati, OH (US) 45208

(*) Notice: Subject to any disclaimer, the term of this patent is extended or adjusted under 35 U.S.C. 154(b) by 0 days.

(21) Appl. No.: 11/860,007

(22) Filed: Sep. 24, 2007

(65) Prior Publication Data

US 2009/0077861 A1    Mar. 26, 2009

(51) Int. Cl.
*A01M 25/00* (2006.01)
(52) U.S. Cl. .................. 43/131; 119/52.3; 119/57.9
(58) Field of Classification Search .................. 43/131; 119/51.03, 52.2, 52.3, 57.8, 57.9, 464, 477
See application file for complete search history.

(56) References Cited

U.S. PATENT DOCUMENTS

| | | | | |
|---|---|---|---|---|
| 716,533 A | * | 12/1902 | Harker | 43/131 |
| 794,323 A | * | 7/1905 | Small | 43/131 |
| 886,934 A | * | 5/1908 | Bradford | 43/131 |
| 890,430 A | * | 6/1908 | Mann | 43/131 |
| 1,113,842 A | * | 10/1914 | Sill | 43/131 |
| 1,189,779 A | * | 7/1916 | Becker | 119/52.2 |
| 1,233,332 A | * | 7/1917 | Erickson | 43/131 |
| 1,443,287 A | * | 1/1923 | Snyder et. al. | 43/131 |
| 1,964,611 A | * | 6/1934 | Watson | 43/131 |
| 2,190,721 A | * | 2/1940 | Mallgraf | 119/431 |
| 2,359,341 A | * | 10/1944 | Weil | 43/131 |
| 2,392,532 A | * | 1/1946 | Hyde | 119/51.03 |
| 2,568,168 A | * | 9/1951 | Query | 43/131 |
| 2,591,459 A | * | 4/1952 | Meany | 119/52.3 |
| 2,683,326 A | * | 7/1954 | Gardner et al. | 43/131 |
| 2,750,707 A | * | 6/1956 | Ekstedt | 43/131 |
| 2,763,093 A | * | 9/1956 | Wellington et al. | 43/131 |
| 2,865,326 A | * | 12/1958 | Lowe, Jr. | 119/52.2 |
| 2,896,362 A | * | 7/1959 | Wingate | 43/131 |
| 2,944,364 A | * | 7/1960 | Kelly | 43/131 |
| 2,997,022 A | * | 8/1961 | Kay | 43/131 |
| 3,124,103 A | * | 3/1964 | Stainbrook | 119/52.3 |
| 3,124,277 A | * | 3/1964 | Helland | 43/131 |

(Continued)

FOREIGN PATENT DOCUMENTS

DE        10207916 C1  *  4/2003

(Continued)

OTHER PUBLICATIONS

International Search Report and Written Opinion of the International Searching Authority, International Application No. PCT/US2008/075962, Mailed on Oct. 27, 2008.

*Primary Examiner*—Darren W Ark
(74) *Attorney, Agent, or Firm*—Ulmer & Berne LLP

(57) ABSTRACT

A dispenser includes a hanger member, a shroud, a tray, and a shelf. The hanger member extends between an upper end and a lower end. The shroud cooperates with the upper end of the hanger member to define an inner area. The shroud includes a wall having a step portion. An access opening is defined adjacent to the step portion. The tray extends from the hanger member adjacent to the lower end. The tray includes a tray surface spaced from the access opening. The shelf is disposed within the inner area. The shroud and the shelf cooperate to define a passageway configured to facilitate passage of a rodent between the shelf and the step portion of the wall. Kits and methods are also provided.

24 Claims, 6 Drawing Sheets

U.S. PATENT DOCUMENTS

| | | | |
|---|---|---|---|
| 3,269,052 A * | 8/1966 | Barnhart | 43/131 |
| 3,298,128 A * | 1/1967 | Dill et al. | 43/131 |
| 3,316,883 A * | 5/1967 | Johnson | 119/57.9 |
| 3,372,676 A * | 3/1968 | Williams | 119/52.3 |
| 3,517,454 A * | 6/1970 | Query | 43/131 |
| 3,602,196 A * | 8/1971 | Tucci | 43/131 |
| 3,772,820 A * | 11/1973 | Bond | 43/131 |
| 3,777,711 A * | 12/1973 | Gampp | 119/52.2 |
| 3,919,977 A * | 11/1975 | Clark | 119/52.2 |
| 4,182,070 A * | 1/1980 | Connelly | 43/131 |
| 4,208,829 A * | 6/1980 | Manning | 43/131 |
| 4,211,028 A * | 7/1980 | Roberling | 43/131 |
| 4,231,326 A * | 11/1980 | Hager | 119/52.1 |
| 4,277,907 A * | 7/1981 | Ernest | 43/131 |
| 4,400,904 A * | 8/1983 | Baker | 43/131 |
| 4,453,337 A * | 6/1984 | Williams | 43/131 |
| 4,497,131 A * | 2/1985 | Hicks | 43/131 |
| 4,541,362 A * | 9/1985 | Dehls | 119/57.9 |
| 4,570,377 A * | 2/1986 | Primavera | 43/131 |
| 4,606,298 A * | 8/1986 | Bridge | 119/57.8 |
| 4,611,426 A * | 9/1986 | Willis | 43/131 |
| 4,619,071 A * | 10/1986 | Willis | 43/131 |
| 4,649,865 A * | 3/1987 | Riggi | 119/57.9 |
| 4,663,882 A * | 5/1987 | Koljonen | 43/131 |
| 4,825,581 A * | 5/1989 | Dailey | 43/131 |
| 4,947,797 A * | 8/1990 | Lawrence, Jr. | 119/52.2 |
| 4,974,547 A * | 12/1990 | Graham | 119/52.2 |
| 5,186,123 A * | 2/1993 | Cuddy | 119/52.2 |
| 5,189,984 A * | 3/1993 | Smith | 119/52.2 |
| 5,269,242 A * | 12/1993 | Toldi | 119/52.2 |
| 5,397,033 A * | 3/1995 | Blomquist | 43/131 |
| 5,628,143 A * | 5/1997 | Doucette | 43/131 |
| 5,636,470 A * | 6/1997 | Blomquist | 43/131 |
| 5,771,838 A * | 6/1998 | Bloom et al. | 119/52.2 |
| 5,857,286 A * | 1/1999 | Doucette | 43/131 |
| 5,873,193 A * | 2/1999 | Jensen | 43/131 |
| 5,966,863 A * | 10/1999 | Payton et al. | 43/131 |
| 6,145,242 A * | 11/2000 | Simpson | 43/131 |
| 6,155,205 A * | 12/2000 | Coates | 119/57.9 |
| 6,234,111 B1 * | 5/2001 | Ulman et al. | 119/54 |
| 6,334,407 B1 * | 1/2002 | Schneider | 119/51.01 |
| 6,367,418 B1 * | 4/2002 | Ulman et al. | 119/57.92 |
| 6,408,788 B1 * | 6/2002 | Lieb et al. | 119/52.2 |
| 6,467,216 B2 * | 10/2002 | McManus et al. | 43/131 |
| 6,571,509 B2 * | 6/2003 | Frasier | 43/131 |
| 6,671,999 B1 * | 1/2004 | Doucette | 43/131 |
| 6,748,898 B2 * | 6/2004 | Ulman et al. | 119/57.92 |
| 6,807,768 B2 * | 10/2004 | Johnson et al. | 43/131 |
| 6,874,274 B2 * | 4/2005 | Townsend | 43/131 |
| 6,901,694 B1 * | 6/2005 | Neault et al. | 43/131 |
| 6,910,300 B1 * | 6/2005 | Warren | 43/131 |
| 7,278,235 B2 * | 10/2007 | Kupfer et al. | 43/131 |
| 2005/0132637 A1 * | 6/2005 | Deakins | 43/131 |
| 2006/0130391 A1 * | 6/2006 | Livingston | 43/124 |
| 2006/0231038 A1 * | 10/2006 | Nock | 119/57.8 |
| 2008/0127902 A1 * | 6/2008 | Bent et al. | 119/52.3 |
| 2008/0314329 A1 * | 12/2008 | Willinger et al. | 119/464 |

FOREIGN PATENT DOCUMENTS

| | | | |
|---|---|---|---|
| EP | 1201124 A2 * | 5/2002 | |
| FR | 2557425 A1 * | 7/1985 | |
| WO | 2006069378 A2 | 6/2006 | |

* cited by examiner

INGESTIBLE SUBSTANCE DISPENSER AND METHODS

TECHNICAL FIELD

A dispenser for providing ingestible material to a rodent includes a shelf, a shroud, and a tray. In one embodiment, the dispenser may provide an incapacitating substance to a rodent.

BACKGROUND

Rodents, such as squirrels, chipmunks, woodchucks, gophers, beavers, mice, rats, muskrats, porcupines, or the like may be a nuisance to other animals and people by spreading disease and destroying the surrounding habitat (such as through gnawing). However, trapping, repelling, or even incapacitating the rodents is difficult without endangering the surrounding "non-rodent" wildlife.

SUMMARY

In accordance with one embodiment, a dispenser comprises a hanger member, a shroud, a tray, and a shelf. The hanger member extends between an upper end and a lower end. The shroud cooperates with the upper end of the hanger member to define an inner area. The shroud comprises a wall. The wall comprises a step portion. The wall at least partially defines an access opening adjacent to the step portion. The tray extends from the hanger member adjacent to the lower end. The tray comprises a tray surface spaced from and facing the access opening. The shelf is disposed within the inner area in a spaced arrangement with the tray such that the access opening is disposed between the shelf and the tray. The shroud and the shelf cooperate to define a passageway configured to facilitate passage of a rodent between the shelf and the step portion of the wall.

In accordance with another embodiment, a dispenser comprises a hanger member, a shroud, a tray, and a shelf. The hanger member extends between an upper end and a lower end. The shroud cooperates with the upper end of the hanger member to define an inner area. The shroud comprises a wall. The hanger member at least partially defines an access opening adjacent to the step portion. A tray extends from the hanger member adjacent to the lower end. The tray comprises a tray surface spaced from the access opening. The shelf is disposed within the inner area. The shroud and the shelf cooperate to define a passageway configured to facilitate passage of a rodent between the shelf and the step portion of the wall.

In accordance with yet another embodiment, a feeder kit comprises a dispenser, a first ingestible substance and a second ingestible substance. The dispenser comprises a hanger member, a shroud, a tray, and a shelf. The hanger member extends between an upper end and a lower end. The shroud cooperates with the upper end of the hanger member to define an inner area. The shroud comprises a wall. The wall comprises a step portion. The wall at least partially defines an access opening adjacent to the step portion. The tray extends from the hanger member adjacent to the lower end. The tray comprises a tray surface spaced from and facing the access opening. The shelf comprises a shelf surface. The shelf is disposed within the inner area in a spaced arrangement with the tray such that the access opening is disposed between the shelf and the tray. The shroud and the shelf cooperate to define a passageway configured to facilitate passage of a rodent between the shelf and the step portion of the wall. The first ingestible substance is configured for placement upon the tray surface. The second ingestible substance is configured for placement upon the shelf surface.

In accordance with yet another embodiment a method is provided for dispensing first and second ingestible substances to a rodent. The method comprises attaching a shroud to a vertical support member. The shroud at least partially defines an inner area and an access opening. The method further comprises providing a shelf within the inner area. The shelf comprises a shelf surface and cooperates with the shroud to define a passageway. The access opening is configured to facilitate passage of a rodent's body. The passageway is configured to facilitate passage of a rodent between the shelf and the shroud. The method further comprises attaching a tray to the vertical support member. The tray comprises a tray surface spaced from and facing the access opening. The method yet further comprises providing a first ingestible substance upon the tray surface. The method still further comprises providing a second ingestible substance upon the shelf surface.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
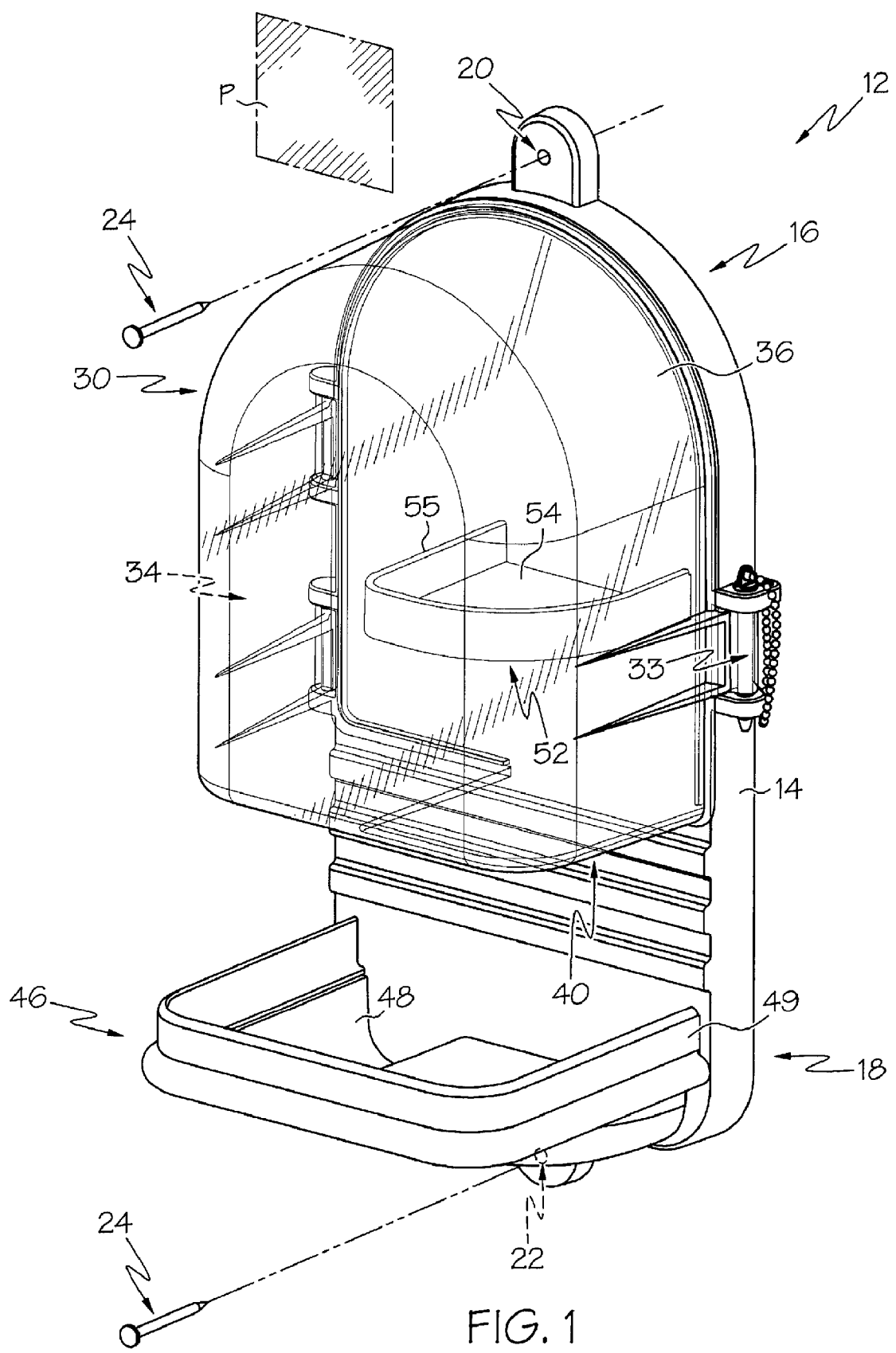
FIG. 1 is a front perspective view depicting a dispenser in accordance with one embodiment.

The present invention and its operation are hereinafter described in detail in connection with the views and examples of FIGS. 1-6. A dispenser 12 may provide ingestible material for consumption by a rodent. As will be described in more detail below, the dispenser 12 may also prevent persons and other animals from inadvertently accessing the ingestible material. As illustrated in FIGS. 1-5, the dispenser 12 may comprise a hanger member 14 extending between an upper end 16 and a lower end 18. In one embodiment, as shown in FIG. 1, the hanger member 14 may comprise a substantially planar member extending along an imaginary vertical plane P.

Figure 2:
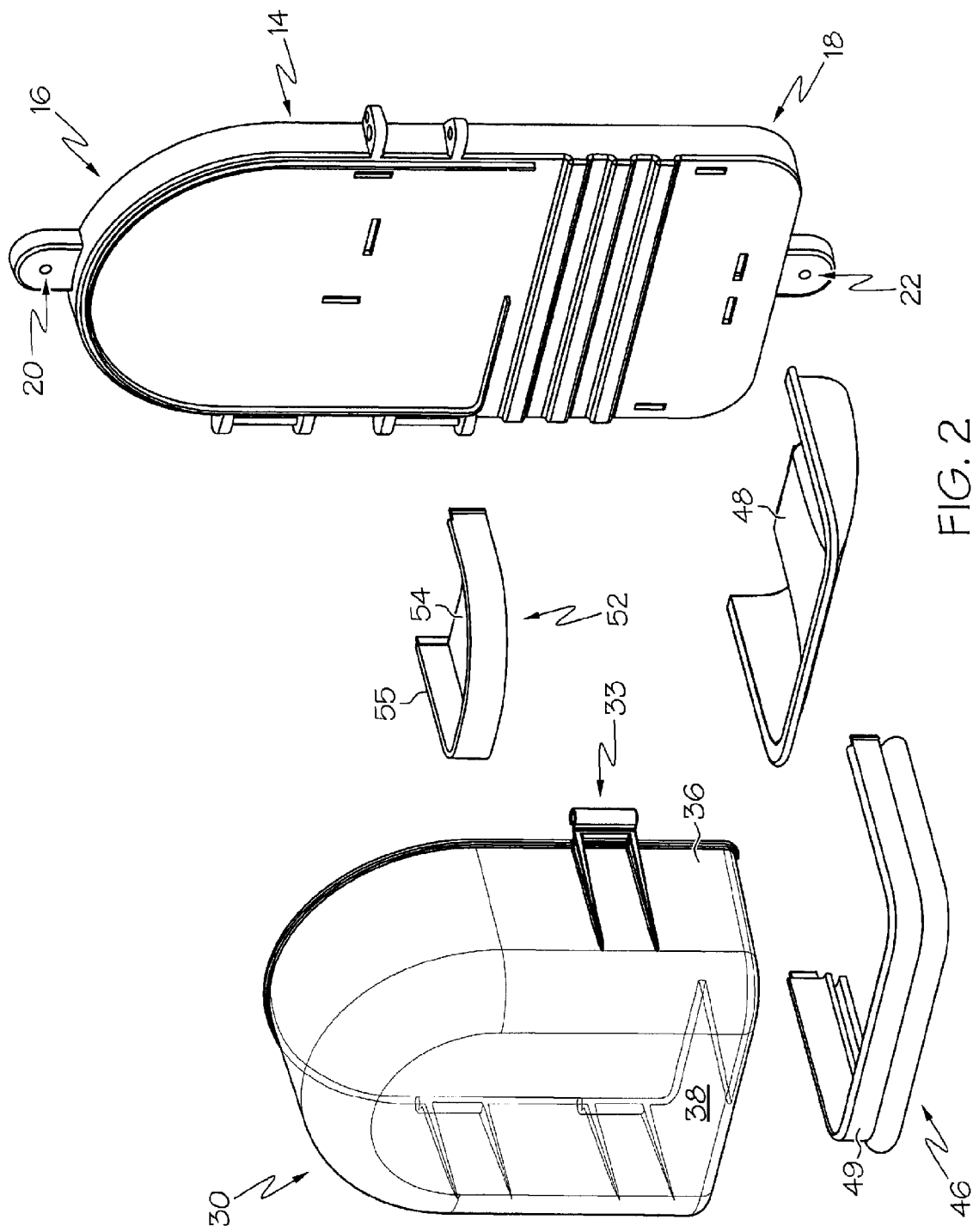
FIG. 2 is a front perspective view depicting the dispenser of FIG. 1.
Figure 4:
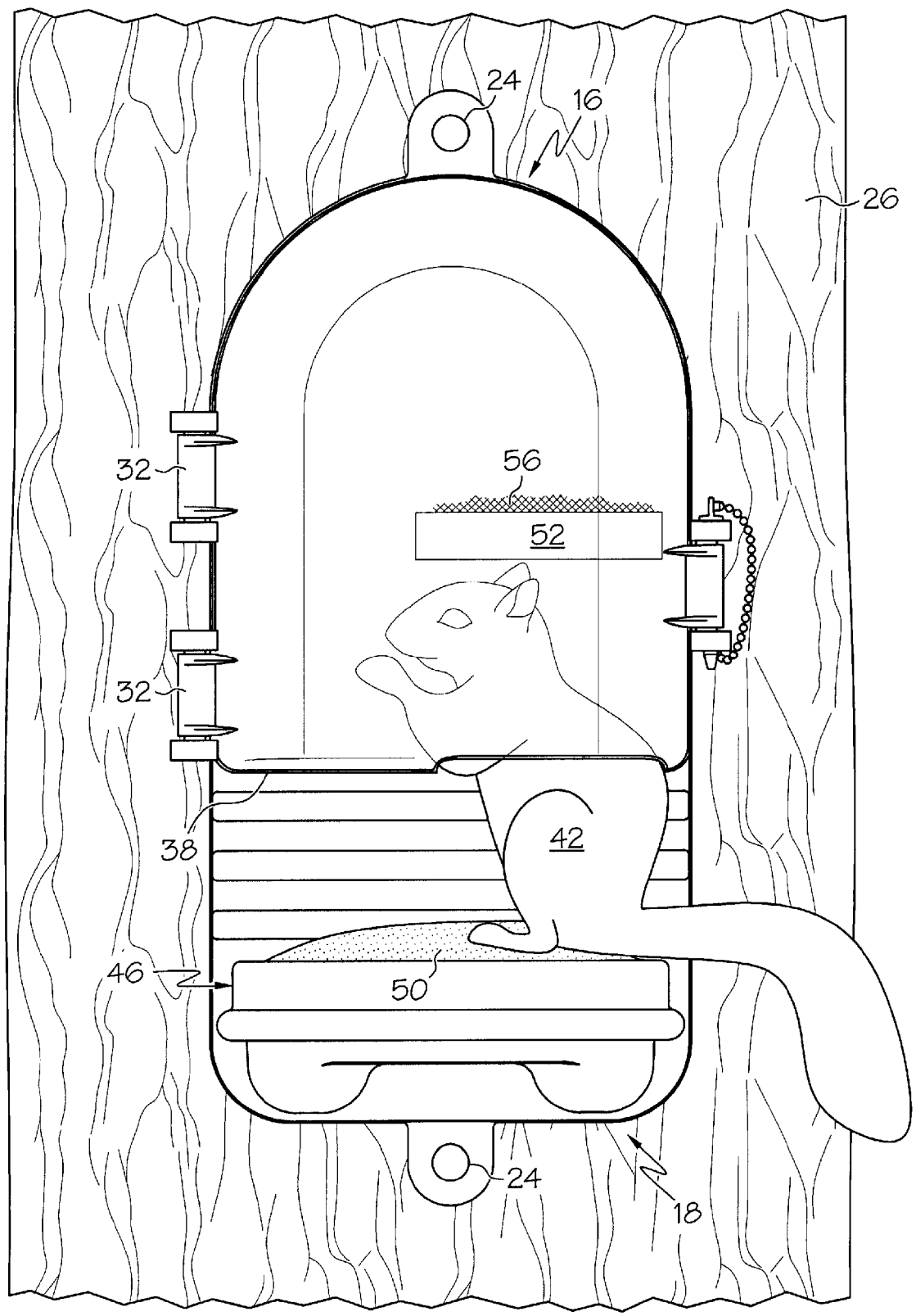
FIG. 4 is a front elevational view depicting the arrangement of FIG. 3, wherein the rodent is shown to be supported upon the tray surface and extending into an access opening.
Figure 5:
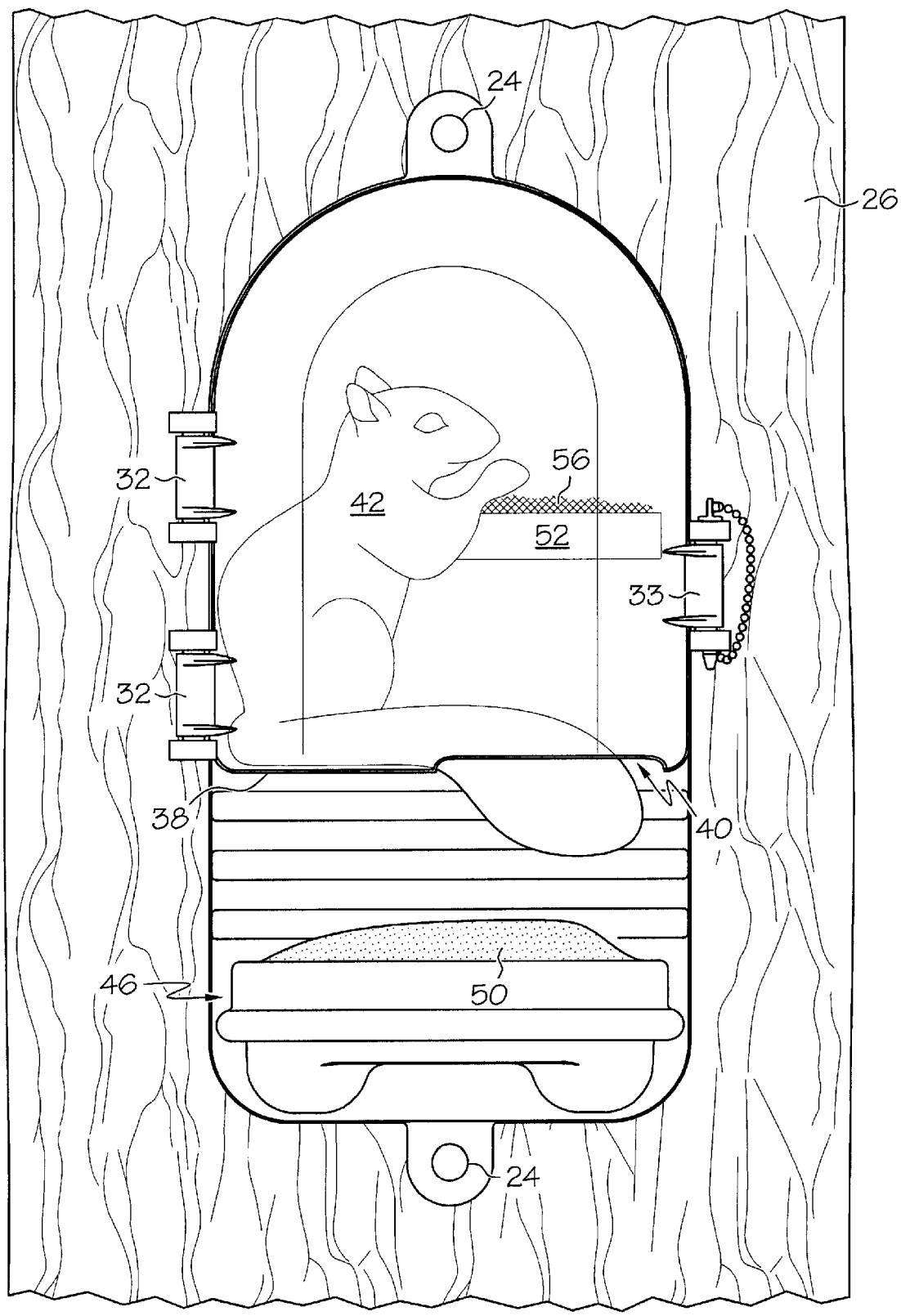
FIG. 5 is a front elevational view depicting the arrangement of FIG. 3, wherein the rodent is shown to be supported on a step portion of a shroud and feeding from the shelf surface.
Figure 6:
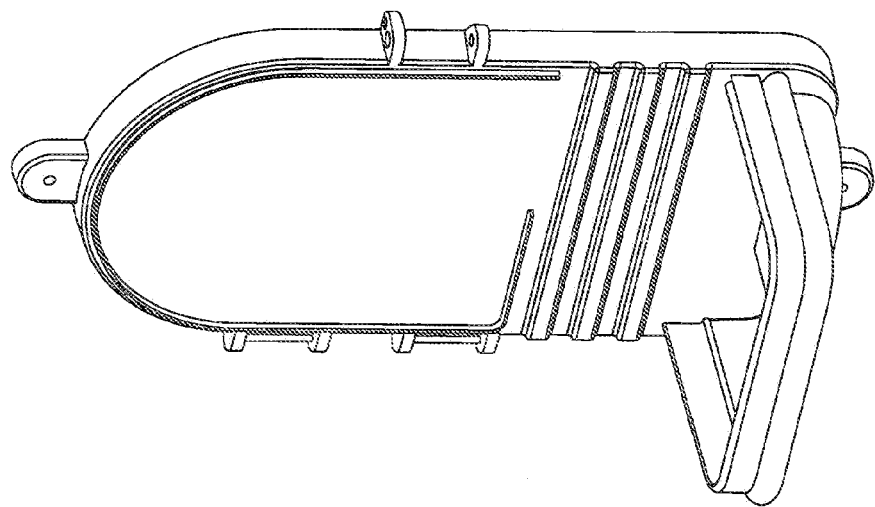
FIG. 6 is a front perspective view depicting a dispenser in accordance with another embodiment.
Figure 6:
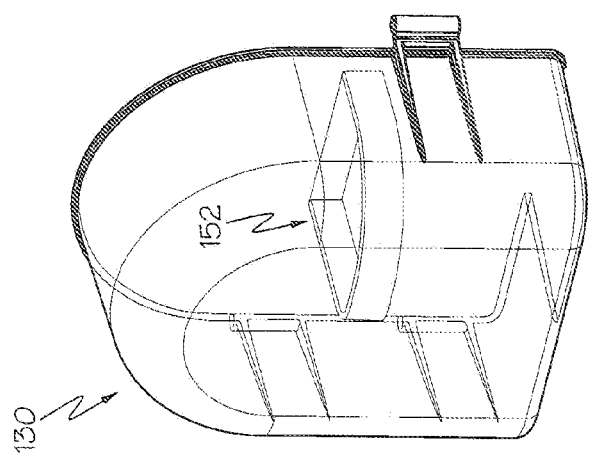

A shelf and a shroud may be associated with the hanger member. In particular, a shroud may cooperate with an upper end of a hanger member to define an inner area, and a shelf may be disposed within the inner area. In one embodiment, and as illustrated in FIGS. 1-5, the dispenser 12 may comprise a shelf 52 and a shroud 30. The shroud 30 may be attached to the upper end 16 of the hanger member 14 and may define an inner area 34. The shelf 52 may extend from the upper end 16 of the hanger member 14 in a cantilevered arrangement such that the shelf 52 is disposed within the inner area 34. Although the shelf 52 is illustrated in FIG. 2 to comprise tabs for interfacing corresponding apertures in the hanger member 14, it will be appreciated that a shelf may be provided within an inner area in any of a variety of alternative configurations. For example, a shelf may be formed integrally with a hanger member (e.g., through injection molding, thermoform, or three-dimensional inkjet printing). In another example, as illustrated in FIG. 6, a shelf 152 may extend from a shroud 130 in a cantilevered arrangement. Although, FIG. 6 illustrates the shelf 152 as being formed integrally with the shroud 130, it will be appreciated that a shelf may be otherwise coupled with a shroud such as with tabs, for example. Although the shelf 52 is shown in FIG. 1 to extend substantially perpendicular to the imaginary plane, P, it will be appreciated that a shelf may extend in any of a variety of alternative configurations.

The shroud 30 is shown in FIGS. 1 and 3-5 to be hingedly attached to the upper end 16 of the hanger member 14. In such an embodiment, the shroud 30 may comprise hinges 32 and a clip 33. The shroud 30 may be selectively moved with respect to the upper end 16 of the hanger member 12 by disengaging the clip 33 from the hanger member 14 and pivoting the shroud 30 about a hinge axis $A_1$ shown in FIG. 3. It will be appreciated that selective movement of the shroud 30 with respect to the hanger member 14 may provide a person access to the shelf 52 and/or the inner area 34 in order to provide ingestible material onto the shelf 52 (as will be described in more detail below), to clean the inside of the shroud 30, or the like. It will be also appreciated that a shroud may be attached to a hanger member in any of a variety of other suitable arrangements for facilitating selective movement of the shroud with respect to the hanger member (e.g., involving screws, magnets, hook and loop fasteners, interlocking mechanical features, and the like). Alternatively, a shroud may be integrally formed with or permanently attached to a hanger member and may include an access panel to provide a person access to the inner area and/or the shelf without moving the shroud.

An access opening may be defined by the shroud to facilitate access for a rodent into the inner area and/or to the shelf. The shroud may comprise a wall at least partially defining the access opening. In one embodiment, as illustrated in FIGS. 1-2, a wall 36 of the shroud 30 may include a step portion 38. In such an embodiment, the step portion 38 and the hanger member 14 can cooperate to define an access opening 40 (shown in FIG. 1). In another embodiment, a wall of the shroud may entirely define an access opening such that access to the inner area and/or the shelf is provided entirely through the shroud. In another embodiment, an access opening may be entirely defined by a hanger member.

A tray may extend from the hanger member adjacent to the lower end such that a rodent may enter the access opening by supporting its body on a tray surface provided by the tray. In one embodiment, as illustrated in FIGS. 1-5, the dispenser 12 may comprise a tray 46. The tray 46 is shown to comprise a tray surface 48 and a tray flange 49. Although the tray flange 49 is illustrated in FIG. 2 to include tabs for interfacing corresponding apertures in the hanger member 14, it will be appreciated that a tray can be attached to a hanger member in any of a variety of other configurations, or might even be integrally formed with a hanger member (e.g., through injection molding, thermoform, or three-dimensional inkjet printing). Although the tray 46 is shown in FIG. 1 to extend substantially perpendicular to the imaginary plane P, it will be appreciated that a tray may extend from a hanger member in any of a variety of other configurations.

Figure 3:
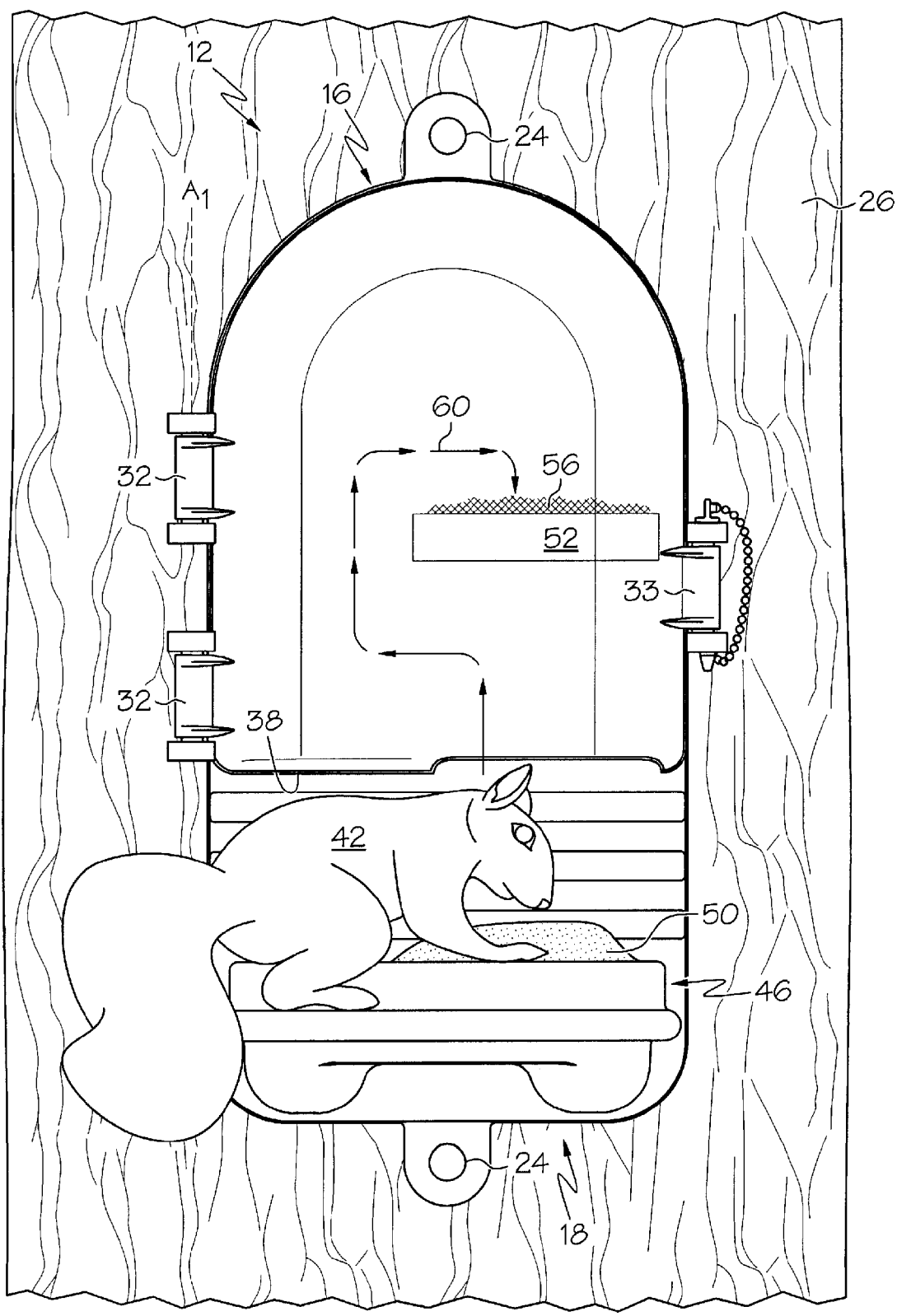
FIG. 3 is a front elevational view depicting the dispenser of FIG. 1 attached to a tree with fasteners, wherein a first substance is provided on a tray surface, and a second substance is provided on a shelf surface, and a rodent is shown to be supported upon the tray surface and feeding from the tray surface.

A first ingestible substance may be provided on the tray surface 48. In one embodiment, as illustrated in FIGS. 3-5, the first ingestible substance may comprise a food 50 that is attractive to a rodent such as, for example, sunflower seeds or cheese. In one embodiment, the food 50 may comprise pellets. The tray 46 may be arranged to retain the first ingestible substance. Although the tray surface 48 is illustrated in FIGS. 1-5 to comprise a bowl-shaped surface, it will be appreciated that a tray surface may have any of a variety of other suitable shapes (e.g., flat, grated). When the food 50 is disturbed by an animal, rodent or otherwise, the tray surface 48 and tray flange 49 may retain the food 50 on the tray surface 48 to keep the material from spilling off of the tray 46.

A second ingestible substance may be provided on a shelf surface. In one embodiment, the second ingestible substance may differ from the first ingestible substance. In particular, as illustrated in FIGS. 3-5, the second ingestible substance may comprise an incapacitating substance 56, such as a poison or repellant. In one embodiment, the incapacitating substance 56 may comprise a congealed block. The shelf may be arranged to retain the second ingestible substance. In one embodiment, as shown in FIG. 1, the shelf 52 may comprise a shelf surface 54. Although the shelf surface is illustrated in FIGS. 1-5 to comprise a flat surface, it will be appreciated that a shelf surface may have any of a variety of other suitable shapes (e.g., bowl-shaped, grated). The shelf 52 may comprise a shelf flange 55 disposed along a perimeter of the shelf surface 54 and extending upward from the shelf surface 54. In such an embodiment, when the incapacitating substance 56 is disturbed (as in FIG. 5) by an animal, rodent or otherwise, the shelf surface 54 and shelf flange 55 may retain the incapacitating substance 56 on the shelf surface 54 to keep the material from spilling off of the shelf 52.

Since the ingestible substance provided on the shelf (e.g., an incapacitating substance) may be intended only for a rodent, it will be appreciated that the access opening, shroud, shelf, and tray may be configured and/or arranged to facilitate access by a rodent to the shelf while restricting access by other animals to the shelf and perhaps also the inner area. It will also be appreciated that such a configuration and/or arrangement may be configured to generally maintain the second ingestible substance within the inner area.

The tray can extend from the hanger member in a spaced relationship from the access opening. In one embodiment, as illustrated in FIGS. 1 and 3-5, the tray 46 may extend from the hanger member 14 such that the tray surface 48 is disposed vertically beneath the access opening 40. The tray surface can face the access opening and can be configured to support the feet of a rodent when entering the access opening. In one embodiment, as illustrated in FIGS. 1 and 3-5, the tray surface 48 may be provided beneath the access opening 40 and substantially parallel with the step portion 38. In such an embodiment, as illustrated in FIG. 4, a rodent 42 may access the inner area 34 by stepping upon the tray surface 48. However, it will be appreciated that a tray surface can be provided in any of a variety of alternative configurations with respect to an access opening.

It will be appreciated that the spacing of the tray with respect to the access opening may facilitate access by a rodent to the inner area while also restricting access by other animals. For instance, as illustrated in FIG. 3, the spacing between the tray surface 48 and the access opening 40 may provide enough space for a rodent 42 to support itself on the tray surface 48. Conversely, a larger animal, such as a cat, may not fit between the tray surface 48 and the access opening 40. Furthermore, as illustrated in FIG. 4, the spacing between the tray surface 48 and the access opening 40 may allow a rodent 42 to support itself on the tray surface 48 and reach into the inner area 34 through the access opening 40. Conversely, a smaller animal, such as a kitten, may not be tall enough to reach into the inner area 34 through the access opening 40.

The hanger member and the shroud may also be configured to facilitate access of a rodent to the shelf while restricting the access of other animals to the shelf. For instance, as illustrated in FIGS. 1 and 3-5, the access opening 40 may be sized to facilitate passage of a rodent's entire body. In such an embodiment, a larger animal may be restricted from the inner area 34. In addition, as illustrated by FIGS. 1 and 3-5, the access opening 40 may be accessible from beneath the shroud 30 to restrict access of winged animals (e.g., birds) to the inner area 34 while permitting a rodent to access the inner area 34 by standing on the tray surface 48.

The shroud and the shelf may cooperate to define a passageway. The passageway may be configured to facilitate passage of a rodent between the shelf and a wall of the shroud and to furthermore facilitate access by the rodent to the shelf surface. In one embodiment, and as illustrated in FIGS. 1 and 3-5, the shelf 52 may be disposed above the access opening 40 and spaced from the step portion 38 of the wall 36 of the shroud 30 such that a passageway 60 (shown in FIG. 3) leading to the shelf surface 54 is defined between the step portion 38 and the shelf 52. In such an embodiment, the spacing between the shelf 52 and the step portion 38 may be sufficient to allow a rodent's entire body to pass between the shelf 52 and the step portion 38, as illustrated in FIGS. 4 and 5. The step portion 38 may be configured to support at least one foot of a rodent 42. In such an embodiment, the spacing between the shelf 52 and the step portion 38 may be sufficient to allow a rodent to stand on the step portion 38 and access the shelf surface 54. The passageway, however, may also restrict a larger animal from passing between the step portion 38 and the shelf 52 and/or from standing on the step portion 38. Although the passageway 60 is illustrated in FIG. 3 to comprise a substantially hook-shaped passageway, it will be appreciated that a shroud and a shelf may cooperate in any of a variety of arrangements and configurations to define any of a variety of passageway configurations.

The shelf may be disposed within the inner area in a spaced arrangement with the tray. For example, as shown in FIGS. 1 and 3-5, the shelf 52 may be disposed within the inner area 34 such that the access opening 40 is disposed between the shelf 52 and the tray 46. In such an arrangement, a rodent may support its body on the tray 46 to extend its body into the access opening 40. Furthermore, in such an arrangement, the shelf 52 may not be directly accessible from the tray 46 and a rodent may climb into the access opening 40 to access the shelf 52. In one embodiment, as illustrated in FIGS. 1 and 3-5, the shelf 52 may be disposed within the inner area 34 vertically above the tray 46 such that the access opening 40 is disposed between the shelf 52 and the tray 46. It will be appreciated that the spaced arrangement between the shelf and the tray may facilitate access of a rodent to the shelf while also restricting the access of other animals to the shelf. In particular, the shelf may not be accessible directly from the tray surface. Instead, a rodent may be required to climb into the inner area to access the shelf surface. It will also be appreciated that the spaced arrangement between the shelf and the tray may facilitate retention of the second ingestible substance within the inner area. In particular, any ingestible substance dropped from the shelf surface may drop onto the wall of the shroud such that it is retained within the inner area.

It will be appreciated that the dispenser 12 may be provided near any of a variety of areas that are inhabited by rodents to incapacitate or repel the rodents. As illustrated by the rodent 42 in FIGS. 3-5, a rodent 42 may interact with the dispenser 12 by supporting itself on the tray surface 48, entering the inner area 34 through the access opening 40, and accessing the shelf 52 to ingest the ingestible substance (e.g., 56) provided upon the shelf surface 54 (shown in FIG. 1). Depending on the type of substance provided upon the shelf surface, the rodent may be repelled or incapacitated after ingesting the substance. In one embodiment, as illustrated in FIGS. 3-5, the dispenser 12 may be attached to a tree 26 such that a rodent may access the dispenser by first climbing the tree 26. In such an embodiment, fasteners 24 can be inserted through apertures 20, 22 (shown in FIGS. 1 and 2) in the upper and lower ends 16, 18 of the hanger member 14 to facilitate mounting of the dispenser 12 to the tree 26. It will be appreciated that the dispenser may be attached to any of a variety of suitable vertical surfaces (e.g., an outer wall of a house) or along any of a variety of non-elevated locations (e.g., along the ground).

In another embodiment, it will be appreciated that a shroud and/or a tray can be attached directly to a vertical support member, and without the presence of a hanger member. A shelf may be provided within an inner area defined by the shroud, and can be attached to the shroud or to the vertical support member. The tray can be attached to the vertical support member at a location spaced from an access opening defined by the shroud and/or the vertical support member.

Although the second ingestible substance (e.g., incapacitating substance 56) may be harmful to non-rodents and people, it will be appreciated that the dispenser 12 may minimize the likelihood of inadvertent contact by non-rodents and people with the second ingestible substance. In particular, since the shroud and shelf cooperate to maintain the second ingestible substance within the inner area, the second ingestible substance which may drop from the shelf (e.g., when a rodent is feeding) may come to rest on the step portion of the shroud and thus may not be readily accessible to unintended rodents or animals. Additionally, it would be appreciated that the dispenser can be mounted to a vertical surface out of the reach of children and perhaps adults.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A dispenser comprising:
 a hanger member extending between an upper end and a lower end;
 a shroud cooperating with the upper end of the hanger member to define an inner area, the shroud comprising a wall, the wall comprising a step portion and at least partially defining an access opening adjacent to the step portion;
 a tray extending from the hanger member adjacent to the lower end and being disposed outside of the inner area, the tray comprising a tray surface spaced from the access opening; and a shelf disposed within the inner area and defining a generally upwardly extending perimeter that is configured to facilitate retention of an ingestible substance upon the shelf, and the shelf extending from one of the shroud and the hanger member in a cantilevered arrangement;

wherein:

the shroud and the shelf cooperate to define a passageway configured to facilitate passage of a rodent between the shelf and the step portion of the wall; and the step portion of the wall is configured to provide an underlying support for a rodent in reaching the shelf.

2. A dispenser comprising:

a hanger member extending between an upper end and a lower end;

a shroud cooperating with the upper end of the hanger member to define an inner area, the shroud comprising a wall, the wall comprising a step portion and at least partially defining an access opening adjacent to the step portion;

a tray extending from the hanger member adjacent to the lower end and being disposed outside of the inner area, the tray comprising a tray surface spaced from and facing the access opening; and a shelf disposed within the inner area in a spaced arrangement with the tray such that the access opening is disposed between the shelf and the tray, the shelf defining a generally upwardly extending perimeter that is configured to facilitate retention of an ingestible substance upon the shelf, and the shelf extending from one of the shroud and the hanger member in a cantilevered arrangement;

wherein:

the shroud and the shelf cooperate to define a passageway configured to facilitate passage of a rodent between the shelf and the step portion of the wall; and the step portion of the wall is configured to provide underlying support for a rodent reaching in the shelf.

3. The dispenser of claim 2 wherein the step portion at least partially defines the access opening.

4. The dispenser of claim 2 wherein the step portion is configured to support at least one foot of a rodent within the passageway.

5. The dispenser of claim 2 wherein the shelf comprises a shelf surface, and the passageway is further configured to facilitate access by a rodent to the shelf surface.

6. The dispenser of claim 5 wherein the passageway is substantially hook-shaped.

7. The dispenser of claim 2 wherein the hanger member extends along an imaginary vertical plane and the step portion, the tray, and the shelf extend in a direction substantially perpendicular to the imaginary vertical plane.

8. The dispenser of claim 2 wherein the shelf extends from the hanger member.

9. The dispenser of claim 2 wherein the access opening is configured to facilitate passage of a rodent's entire body.

10. The dispenser of claim 9 wherein the passageway is further configured to facilitate passage of a rodent's entire body.

11. The dispenser of claim 2 wherein the upper end of the hanger member defines an upper aperture, the lower end of the hanger member defines a lower aperture, and the upper aperture and the lower aperture are configured to receive respective fasteners to facilitate mounting of the dispenser to a vertical support member.

12. The dispenser of claim 2 wherein the shroud is hingedly attached to the hanger member.

13. A feeder kit comprising:

a dispenser comprising:

a hanger member extending between an upper end and a lower end;

a shroud cooperating with the upper end of the hanger member to define an inner area, the shroud comprising a wall, the wall comprising a step portion and at least partially defining an access opening adjacent to the step portion;

a tray extending from the hanger member adjacent to the lower end and being disposed outside of the inner area, the tray comprising a tray surface spaced from and facing the access opening; and a shelf comprising a shelf surface, the shelf being disposed within the inner area in a spaced arrangement with the tray such that the access opening is disposed between the shelf and the tray, and the shelf extend in from one of the shroud and the hanger member in a cantilevered arrangement;

wherein:

the shroud and the shelf cooperate to define a passageway configured to facilitate passage of a rodent between the shelf and the step portion of the wall; and the step portion of the wall is configured to provide underlying support for a rodent in reaching the shelf surface; and a first ingestible substance configured for placement upon the tray surface; and a second ingestible substance configured for placement upon the shelf surface;

wherein the shelf defines a generally upwardly extending perimeter that is configured to facilitate retention of the second ingestible substance upon the shelf surface.

14. The feeder kit of claim 13 wherein the step portion at least partially defines the access opening.

15. The feeder kit of claim 13 wherein the step portion is configured to support at least one foot of a rodent within the passageway.

16. The feeder kit of claim 13 wherein the access opening is configured to facilitate passage of a rodent's entire body.

17. The feeder kit of claim 13 wherein the passageway is further configured to facilitate passage of a rodent's entire body.

18. The feeder kit of claim 13 wherein the shelf extends from the hanger member.

19. The feeder kit of claim 13 wherein the first ingestible substance differs from the second ingestible substance.

20. The feeder kit of claim 19 wherein the first ingestible substance comprises food attractive to a rodent and wherein the second ingestible substance comprises an incapacitating substance.

21. The feeder kit of claim 13 wherein the upper end of the hanger member defines an upper aperture, the lower end of the hanger member defines a lower aperture, and the upper aperture and the lower aperture are configured to receive respective fasteners to facilitate mounting of the dispenser to a vertical support member.

22. The feeder kit of claim 13 wherein the shroud is hingedly attached to the hanger member.

23. A method for dispensing first and second ingestible substances to a rodent, the method comprising:

attaching a shroud to a vertical support member, wherein the shroud at least partially defines an inner area and an access opening;

providing a shelf within the inner area, the shelf comprising a shelf surface and defining a generally upwardly extending perimeter, the shelf extending from one of the shroud and the vertical support member in a cantilevered arrangement, wherein the shelf cooperates with the shroud to define a passageway, and wherein the passageway is configured to facilitate passage of a rodent between the shelf and the shroud;

attaching a tray to the vertical support member at a location outside of the inner area, wherein the tray comprises a tray surface spaced from and facing the access opening;

providing a first ingestible substance upon the tray surface; and providing a second ingestible substance upon the shelf surface, wherein the generally upwardly extending perimeter of the shelf is configured to facilitate retention of the second ingestible substance upon the shelf surface.

24. The method of claim 23 wherein the first ingestible substance comprises food attractive to a rodent and wherein the second ingestible substance comprises an incapacitating substance.

* * * * *